(12) United States Patent
Prissok et al.

(10) Patent No.: US 11,267,928 B2
(45) Date of Patent: Mar. 8, 2022

(54) METHOD FOR PRODUCING A DIBLOCK COPOLYMER

(71) Applicant: BASF SE, Ludwigshafen am Rhein (DE)

(72) Inventors: Frank Prissok, Lemfoerde (DE); Elmar Poeselt, Lemfoerde (DE); Dirk Kempfert, Lemfoerde (DE); Florian Puch, Ludwigshafen (DE); Martina Schoemer, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 327 days.

(21) Appl. No.: 16/078,041

(22) PCT Filed: Feb. 22, 2017

(86) PCT No.: PCT/EP2017/053980
§ 371 (c)(1),
(2) Date: Aug. 21, 2018

(87) PCT Pub. No.: WO2017/144492
PCT Pub. Date: Aug. 31, 2017

(65) Prior Publication Data
US 2019/0055341 A1    Feb. 21, 2019

(30) Foreign Application Priority Data
Feb. 22, 2016 (EP) .................... 16156674

(51) Int. Cl.
*C08G 18/40* (2006.01)
*C08G 18/08* (2006.01)
*C08G 18/24* (2006.01)
*C08G 18/42* (2006.01)
*C08G 18/48* (2006.01)
*C08G 18/73* (2006.01)
*C08G 18/76* (2006.01)
*C08G 101/00* (2006.01)

(52) U.S. Cl.
CPC ..... *C08G 18/4018* (2013.01); *C08G 18/0895* (2013.01); *C08G 18/244* (2013.01); *C08G 18/4213* (2013.01); *C08G 18/4216* (2013.01); *C08G 18/4808* (2013.01); *C08G 18/4854* (2013.01); *C08G 18/73* (2013.01); *C08G 18/7664* (2013.01); *C08G 18/7671* (2013.01); *C08G 2101/00* (2013.01); *C08G 2120/00* (2013.01); *C08G 2150/00* (2013.01)

(58) Field of Classification Search
None
See application file for complete search history.

(56) References Cited

U.S. PATENT DOCUMENTS

| 6,579,952 | B1* | 6/2003 | Niki | C08G 18/0895 |
|---|---|---|---|---|
| | | | | 525/440.12 |
| 2004/0171767 | A1* | 9/2004 | Pohlmann | C08G 18/4202 |
| | | | | 525/453 |
| 2016/0304659 | A1 | 10/2016 | Prissok et al. | |

FOREIGN PATENT DOCUMENTS

| CA | 2136125 A1 | 6/1995 |
|---|---|---|
| DE | 101 23 002 C1 | 8/2002 |
| EP | 0 656 397 A1 | 6/1995 |
| EP | 1 068 252 A1 | 1/2001 |
| EP | 1 693 394 A1 | 8/2006 |
| WO | WO 99/11710 A1 | 3/1999 |
| WO | WO 99/51656 A1 | 10/1999 |
| WO | WO 2015/063062 A1 | 5/2015 |

OTHER PUBLICATIONS

Sigma-Alderich, "Poly(tetrahydofuran," pp. 1-4, at https://www.sigmaaldrich.com/catalog/product/aldrich/345296?lang=en&region=US (accessed Aug. 16, 2020) (Year: 2020).*
BASF, "Expand your success on elastomers: PolyTHF," (2010), at https://documents.basf.com/3dd9c72ad6da479f1abf206c019674e4a664cd44. (Year: 2010).*
International Search Report dated May 16, 2017 in PCT/EP2017/053980.
International Preliminary Report on Patentability dated Aug. 23, 2018 in PCT/EP2017/053980.
Dr. K. Schauerte, et al., "3.1 Polyole", 3 Rohstoffe, Kunststoffhandbuch, Band 7, Polyurethane, 1993, 19 pages.
Dr. Manfred Dahm, "2.3 Zusatzstoffe", Kunststoffhandbuch, Band VII, 1966, 27 pages.
"Polybutylenterephthalat", Wikipedia, Retrieved Aug. 5, 2016, https://de.wikipedia.org/wiki/Polybutylenterephthalat.
"Polyethylennaphthalat", Wikipedia, Retrieved Aug. 5, 2016, https://de.wikipedia.org/wiki/Polyethylennaphthalat.
"Polytetrahydrofuran", Wikipedia, Retrieved Aug. 5, 2016, https://de.wikipedia.org/wiki/Polytetrahydrofuran.

* cited by examiner

*Primary Examiner* — Randy P Gulakowski
*Assistant Examiner* — Ha S Nguyen
(74) *Attorney, Agent, or Firm* — Grüneberg and Myers, PLLC

(57) ABSTRACT

The present invention relates to a process for producing a diblock copolymer comprising the reaction of at least one aromatic polyester having a melting point in the range from 160° C. to 350° C. and at least one polymer diol having a melting point of less than 100° C. at a temperature of greater than 200° C. to obtain a mixture (G-a); and the reaction of the mixture (G-a) with at least one diisocyanate, wherein the diisocyanate is employed in a molar amount of at least 0.9 based on the alcohol groups of the polymer diols. The present invention further relates to diblock copolymers obtained or obtainable according to such a process and to the use of such diblock copolymers for producing extruded, injection molded and pressed articles and also foams, cable sheaths, hoses, profiles, drive belts, fibers, nonwovens, films, moldings, plugs, housings, damping elements for the electricals industry, automotive industry, mechanical engineering, 3-D printing, medicine and consumer goods.

16 Claims, No Drawings

METHOD FOR PRODUCING A DIBLOCK COPOLYMER

The present invention relates to a process for producing a diblock copolymer comprising the reaction of at least one aromatic polyester having a melting point in the range from 160° C. to 350° C. and at least one polymer diol having a melting point of less than 100° C. at a temperature of greater than 200° C. to obtain a mixture (G-a); and the reaction of the mixture (G-a) with at least one diisocyanate, wherein the diisocyanate is employed in a molar amount of at least 0.9 based on the alcohol groups of the polymer diols. The present invention further relates to diblock copolymers obtained or obtainable according to such a process and to the use of such diblock copolymers for producing extruded, injection molded and pressed articles and also foams, cable sheaths, hoses, profiles, drive belts, fibers, nonwovens, films, moldings, plugs, housings, damping elements for the electricals industry, automotive industry, mechanical engineering, 3-D printing, medicine and consumer goods.

Polymers based on thermoplastic polyurethanes (TPU) are employed in various fields. Depending on the application the properties of the polymer may be modified. Thus for example thermoplastic polyurethanes are modified by incorporating additional polyester blocks into the polymer. These are described as hard phase modified thermoplastic polyurethanes (HMP-TPU). Such hard phase modified thermoplastic polyurethanes find wide application in injection molding since the good phase separation and the high crystallinity hard phase result in very short cycle times. They are constructed by transesterification of a short polyester by addition of a short chain diol and subsequent addition of isocyanate and polyols to obtain a triblock copolymer.

EP 0 656 397 discloses triblock polyaddition products comprising TPU blocks and polyester blocks which consist of two hard phase blocks, namely the polyester hard phase and the TPU hard phase, consisting of the urethane hard segment, the oligomeric or polymeric reaction product of an organic diisocyanate and a low molecular weight chain extender, preferably an alkanediol and/or dialkylene glycol and the elastic urethane soft segment, consisting of the higher molecular weight polyhydroxyl compound, preferably a higher molecular weight polyesterdiol and/or polyetherdiol, which are chemically interlinked in blockwise fashion by urethane and/or amide bonds. The urethane or amide bonds are formed from terminal hydroxyl or carboxyl groups of the polyesters and from terminal isocyanate groups of the TPU. The reaction product may also comprise further bonds, for example urea bonds, allophanates, isocyanurates and biurets.

EP 1 693 394 discloses thermoplastic polyurethanes comprising polyester blocks and processes for the production thereof. Thermoplastic polyesters are converted with a diol and the thus obtained reaction product is then reacted with isocyanates.

The hard phase modified thermoplastic polyurethanes known from the prior art have the disadvantage that in the known production processes a certain proportion of the employed diol can react with the isocyanate. This results in a randomly distributed urethane hard phase which affects the hard phase formed from the polyester in terms of crystallization behavior and disrupts the stability of the soft phase. Free urethane bonds in the soft phase have a lower heat stability, have a propensity for dissolution in the soft phase and for irreversible cleavage reactions and thus for degradation of the polymer.

It is accordingly an object of the present invention to provide a polymer and a process for producing a polymer having better low temperature and high temperature properties than products comprising urethane hard phases. It is a further object of the present invention to provide a polymer and a process for producing a polymer which exhibits improved hydrolysis resistance. It is moreover an object of the present invention to provide polymers which exhibit improved cycle times and improved phase separation.

This object is achieved in accordance with the invention by a process for producing a di-block copolymer comprising the steps of
(a) reaction of at least one aromatic polyester having a melting point in the range from 160° C. to 350° C. and at least one polymer diol having a melting point of less than 100° C. at a temperature of greater than 200° C. to obtain a mixture (G-a);
(b) reaction of the mixture (G-a) with at least one diisocyanate,
wherein the diisocyanate is employed in a molar amount of at least 0.9 based on the alcohol groups of the polymer diols.

In the context of the present invention the melting points/melting ranges are determined by DSC unless otherwise stated Unless otherwise stated the DSC measurement is performed at a heating rate of 20° C./min in a temperature range of 70° C. to 250° C. The holding time at 250° C. is 2 minutes, the cooling rate in the cooling run is 20° C./min unless otherwise stated.

The process according to the invention affords diblock copolymers from a high melting point polyester and a polymer diol and subsequent reaction with diisocyanates without formation of a urethane hard phase having a negative effect on the phase separation of the crystalline polyester phase and the amorphous polymer diol phase.

The biphasic block copolymer obtained according to the invention typically comprises crystalline ester blocks and amorphous polyol blocks coupled via amide, ester and/or urethane bonds. According to the invention there is preferably no urethane hard phase in the soft phase.

According to the invention no short-chain diols are employed as additional chain extenders and block construction is therefore not disrupted. The process according to the invention further does not employ any dicarboxylic acids for coupling of the polydiols.

An important prerequisite for a mechanically and chemically stable block copolymer having good heat stability is not only clear phase separation but also sufficient block size of the hard and soft phases which ensure a broad temperature range for the application. This application range may be detected by means of the DMA (temperature range between glass transition of the soft phase and first softening of the hard phase).

In addition to good low temperature and high temperature properties the products obtained with the process according to the invention exhibit good longterm stability. The mechanical properties of the diblock copolymers such as tensile strength, elongation at break and abrasion resistance are also improved compared to products also comprising a urethane hard phase in the soft phase.

The process according to the invention comprises the steps (a) and (b). According to step (a) at least one aromatic polyester having a melting point in the range from 160° C. to 350° C., preferably having a melting point of greater than 180° C., is reacted with at least one polymer diol having a melting point of less than 100° C. at a temperature of greater than 200° C. to obtain a mixture (G-a).

It was found that, surprisingly, an ester cleavage according to step (a) is possible not only with short-chain low-viscosity diols but also with a polymer diol. The polymer diol is preferably not transesterified under the reaction conditions according to step (a) and is preferably completely preserved as a soft phase building block. In the transesterification of the polyester with the polymer diol the hard phase of the diblock copolymer is formed from the polyester fragments and the soft phase is formed from the polymer diol incorporated by esterification and further polymer diol. The obtained product mixture is the mixture (G-a).

According to step (b) of the process according to the invention the mixture (G-a) is reacted with at least one diisocyanate. According to the invention a molecular weight increase is achieved by the reaction with the diisocyanate which reacts with the free acid and alcohol groups to afford amide and urethane groups respectively and extends the polymer chains. According to the invention the diisocyanate is employed in a molar amount of at least 0.9 based on the alcohol groups of the polymer diols.

The reaction according to step a) is preferably effected in continuous fashion. In a further embodiment the present invention accordingly relates to a process for producing a diblock copolymer as described hereinabove, wherein the reaction according to step (a) is effected in continuous fashion.

According to step (a) the reaction is effected at a temperature of above 200° C. The reaction according to step (b) is effected under suitable conditions allowing a reaction of the diisocyanate with the free acid and alcohol groups. According to the invention the reaction may be effected in a suitable apparatus, wherein suitable processes are known per se to those skilled in the art. According to the invention it is also possible for additives or assistants to be employed to accelerate/to improve the reaction according to step (a) or (b). In particular, catalysts may be employed.

Suitable catalysts for the reaction according to step (a) are for example tributyltin oxide, tin(II) dioctoate, dibutyltin dilaurate or Bi(III) carboxylate.

In particular the reaction according to step (a) or the reaction according to step (b) or the reaction according to step (a) and step (b) may be effected in an extruder.

The reaction according to step (a) may for example be effected at a temperature in the range from 200° C. to 310° C., preferably in the range from 220° C. to 300° C. and in particular from 220° C. to 280° C., more preferably from 230° C. to 260° C., and a residence time of 15 seconds to 30 minutes, preferably 20 seconds to 10 minutes, in for example a flowable, softened or preferably molten state of the polyester and the polymer diol, in particular by stirring, rolling, kneading or preferably extruding, for example using customary plasticizing apparatuses, for example mills, kneaders or extruders, preferably in an extruder.

In a further embodiment the present invention accordingly relates to a process for producing a diblock copolymer as described hereinabove, wherein the reaction according to step (a) is effected in an extruder.

The process according to the invention may comprise further steps, for example temperature adjustments or shaping steps.

The reaction according to step (b) may be effected for example at a temperature in the range from 170° C. to 260° C., preferably in the range from 180° C. to 240° C. and in particular from 190° C. to 230° C., and a residence time of 30 seconds to 30 minutes, preferably 1 to 10 minutes.

In a further embodiment the present invention accordingly relates to a process for producing a diblock copolymer as described hereinabove, wherein the reaction according to step (b) is effected at a temperature in the range from 170° C. to 260° C.

The aromatic polyesters employed in accordance with the invention have a melting point in the range from 160° C. to 350° C., preferably a melting point of greater than 180° C. More preferably the polyesters suitable in accordance with the invention have a melting point greater than 200° C., particularly preferably a melting point of greater than 220° C. Accordingly, the polyesters suitable in accordance with the invention particularly preferably have a melting point in the range from 220° C. to 350° C.

Polyesters suitable in accordance with the invention are known per se and comprise at least one aromatic ring bound in the polycondensate main chain which is derived from an aromatic dicarboxylic acid. The aromatic ring may optionally also be substituted, for example by halogen atoms, for example chlorine or bromine, and/or by linear or branched alkyl groups having preferably 1 to 4 carbon atoms, in particular 1 to 2 carbon atoms, for example a methyl, ethyl, isopropyl or n-propyl group and/or a n-butyl, isobutyl or tert-butyl group. The polyesters may be produced by polycondensation of aromatic dicarboxylic acids or mixtures of aromatic and aliphatic and/or cycloaliphatic dicarboxylic acids and also the corresponding ester-forming derivatives, for example dicarboxylic anhydrides, mono- and/or diesters advantageously having not more than 4 carbon atoms in the alcohol radical, with aliphatic dihydroxyl compounds at elevated temperatures, for example of 160° C. to 260° C., in the presence or absence of esterification catalysts.

Suitable in accordance with the invention are in particular aromatic dicarboxylic acids, for example naphthalene dicarboxylic acids, isophthalic acid and in particular terephthalic acid or mixtures of these dicarboxylic acids. When mixtures of aromatic and (cyclo) aliphatic dicarboxylic acids are employed up to 10 mol % of the aromatic dicarboxylic acids may be replaced by aliphatic and/or cycloaliphatic dicarboxylic acids having advantageously 4 to 14 carbon atoms, for example succinic, adipic, azelaic, sebacic, dodecanedioic and/or cyclohexanedicarboxylic acid.

Contemplated aliphatic dihydroxyl compounds are preferably alkanediols having 2 to 6 carbon atoms and cycloalkanediols having 5 to 7 carbon atoms. Recited by way of example and preferably employed are 1,2-ethanediol, 1,4-butanediol, 1,6-hexanediol, neopentyl glycol and 1,4-cyclohexanediol or mixtures of at least two of the recited diols.

Polyesters that have proven themselves exceptionally include specifically the polyalkylene terephthalates of alkanediols having 2 to 6 carbon atoms, in particular aromatic polyesters selected from the group consisting of polybutylene terephthalate (PBT), polyethylene terephthalate (PET) and polyethylene naphtalate (PEN), so that preferably polyethylene terephthalate and especially preferably polybutylene terephthalate or mixtures of polyethylene terephthalate and polybutylene terephthalate find application.

In a further embodiment the present invention accordingly relates to a process for producing a diblock copolymer as described hereinabove, wherein the aromatic polyester is selected from the group consisting of polybutylene terephthalate (PBT), polyethylene terephthalate (PET) and polyethylene naphtalate (PEN). In a further embodiment the present invention accordingly relates to a process for producing a diblock copolymer as described hereinabove, wherein the aromatic polyester is polyethylene terephthalate (PBT).

According to the invention suitable molecular weight ranges (Mn) of the employed polyester are in the range from 2000 to 100 000, particularly preferably in the range from 10 000 to 50 000.

Unless otherwise stated in the context of the present invention the determination of the weight average molecular weights Mw of the thermoplastic block copolymers is effected, dissolved in HFIP (hexafluoroisopropanol), by means of GPC. Determination of the molecular weight is effected by means of two GPC columns arranged in series (PSS-Gel; 100A; 5μ; 300*8 mm, Jordi-Gel DVB; Mixed-Bed; 5μ; 250*10 mm; column temperature 60° C.; flow 1 mL/min; RI detector). Calibration is performed with polymethyl methacrylate (EasyCal; from PSS, Mainz) and HFIP is used as eluent.

According to step (a) the polyester is reacted with a polymer diol having a melting point of less than 100° C. to obtain the mixture (G-a). Suitable polymer diols are known per se to those skilled in the art.

Suitable polymer diols are for example selected from the group consisting of polyetherols, polyesterols, polycarbonate alcohols, hybrid polyols and polysiloxanes.

Polyols are fundamentally known to those skilled in the art and described for example in "Kunststoffhandbuch, Band 7, Polyurethane" [Plastics handbook, volume 7, Polyurethanes], Carl Hanser Verlag, 3rd edition 1993, chapter 3.1. It is particularly preferable to use polyesterols or polyetherols as polyols. Particular preference is given to polyeter polyols. The number average molecular weight of the polyols employed in accordance with the invention is preferably between 500 g/mol and 3000 g/mol, preferably between 600 g/mol and 2500 g/mol, in particular between 650 g/mol and 2000 g/mol.

Preferred polyetherols are in accordance with the invention polyethylene glycols, polypropylene glycols and polytetrahydrofurans.

According to a particularly preferred embodiment the polymer diol is a polytetrahydrofuran (PTHF) having a molecular weight in the Mn range of 500 g/mol to 3000 g/mol.

According to the invention not only PTHF but also other further polyethers are suitable, or else polyesters.

In a further embodiment the present invention accordingly relates to a process for producing a diblock copolymer as described hereinabove, wherein the polymer diol is a polyetherdiol. In another embodiment the present invention also relates to a process for producing a diblock copolymer as described hereinabove, wherein the polymer diol is a polytetrahydrofuran.

According to the invention the polyol may be employed in pure form or in the form of a composition comprising the polyol and at least one solvent. Suitable solvents are known per se to those skilled in the art.

In the context of the present invention the ratio of the polyester and the polyol may be varied within a wide range. According to the invention the polyester and polyol may be used for example in a ratio of 90:10 to 10:90 parts by weight based on the polyester.

In the context of the present invention the reaction may also employ additives or assistants, for example antioxidants, UV absorbers, UV filters, antihydrolysis agents, waxes, lubricants, plasticizers, processing aids, nucleating agents, fillers, flame retardants.

According to step (a) a mixture (G-a) is obtained which may comprise not only the reaction product but also unconverted polyester or unconverted polymer diol. The reaction product is thus present as a mixture according to the invention, wherein the individual molecules may differ for example in terms of distribution and the length of the polyester blocks.

According to step (b) of the process according to the invention the mixture (G-a) obtained in step (a) is reacted with at least one diisocyanate, wherein the diisocyanate is employed in a molar amount of at least 0.9 based on the alcohol groups of the polymer diols.

At least one diisocyanate is employed in accordance with the invention. Mixtures of two or more diisocyanates may also be employed in accordance with the invention. Preferred diisocyanates are in the context of the present invention in particular aliphatic or aromatic diisocyanates.

Furthermore in the context of the present invention pre-reacted prepolymers may be employed as isocyanate components where a portion of the OH components are reacted with an isocyanate in an upstream reaction step. These prepolymers are reacted with the remaining OH components in a further step, the actual polymer reaction, and then form the thermoplastic polyurethane. The use of prepolymers makes it possible also to use OH components having secondary alcohol groups.

Aliphatic diisocyanates employed are customary aliphatic and/or cycloaliphatic diisocyanates, for example tri-, tetra-, penta-, hexa-, hepta- and/or octamethylenediisocyanate, 2-methylpentamethylene-1,5-diisocyanate, 2-ethyltetramethylene-1,4-diisocyanate, hexamethylene-1,6-diisocyanate (HDI), pentamethylene-1,5-diisocyanate, butylene-1,4-diisocyanate, trimethyl hexamethylene-1,6-diisocyanate, 1-isocyanato-3,3,5-trimethyl-5-isocyanatomethylcyclohexane (Isophoronediisocyanate, IPDI), 1,4- and/or 1,3-bis(isocyanatomethyl)cyclohexane (HXDI), 1,4-cyclohexanediisocyanate, 1-Methyl-2,4- and/or 1-methyl-2,6-cyclohexanediisocyanate, 4,4'-, 2,4'- and/or 2,2'-methylenedicyclohexyldiisocyanate (H12MDI).

Preferred aliphatic polyisocyanates are hexamethylene-1,6-diisocyanate (HDI), 1-isocyanato-3,3,5-trimethyl-5-isocyanatomethylcyclohexane and 4,4'-, 2,4'- and/or 2,2'-methylenedicyclohexyldiisocyanate (H12MDI); especially preferred are 4,4'-, 2,4'- and/or 2,2'-methylenedicyclohexyldiisocyanate (H12MDI) and 1-isocyanato-3,3,5-trimethyl-5-isocyanatomethylcyclohexane or mixtures thereof.

The present invention accordingly relates in a further embodiment to a process as described hereinabove, wherein the polyisocyanate is selected from the group consisting of 4,4'-, 2,4'- and/or 2,2'-methylenedicyclohexyldiisocyanate (H12M DI), hexamethylenediisocyanate (HDI) and 1-isocyanato-3,3,5-trimethyl-5-isocyanatomethylcyclohexane (IPDI) or mixtures thereof.

Suitable aromatic diisocyanates are in particular 2,2'-, 2,4'- and/or 4,4'-diphenylmethanediisocyanate (MDI), 1,5-naphthylenediisocyanate (NDI), 2, 4- and/or 2,6-tolylenediisocyanate (TDI), 3,3'-dimethyl-4,4'-diisocyanatodiphenyl (TODI), p-phenylenediisocyanate (PDI), diphenylethane-4,4'-diisocyanate (EDI), diphenylme-thanediisocyanate, 3,3'-dimethyldiphenyldiisocyanate, 1,2-diphenylethanediisocyanate and/or phenylenediisocyanate.

Preferred aromatic diisocyanates are 2,2'-, 2,4'- and/or 4,4'-diphenylmethanediisocyanate (MDI) and mixtures thereof.

According to the invention the diisocyanate is preferably selected from the group consisting of 2,2'-, 2,4'- and/or 4,4'-diphenylmethanediisocyanate (MDI), 2, 4- and/or 2,6-tolylenediisocyanate (TDI), 4,4'-, 2,4'- and/or 2,2'-methylenedicyclohexyldiisocyanate (H12MDI), hexamethylenediisocyanate (HDI) and 1-isocyanato-3,3,5-trimethyl-5-isocyanatomethylcyclohexane (IPDI).

In a further embodiment the present invention accordingly relates to a process for producing a diblock copolymer as described hereinabove, wherein the diisocyanate is selected from the group consisting of 2,2'-, 2,4'- and/or 4,4'-diphenylmethanediisocyanate (MDI), 2, 4- and/or 2,6-tolylenediisocyanate (TDI), 4,4'-, 2,4'- and/or 2,2'-methylenedicyclohexyldiisocyanate (H12MDI), hexamethylenediisocyanate (HDI) and 1-isocyanato-3,3,5-trimethyl-5-isocyanatomethylcyclohexane (IPDI).

According to the invention the diisocyanate may be employed in pure form or in the form of a composition comprising the diisocyanate and at least one solvent. Suitable solvents are known to those skilled in the art. Nonreactive solvents such as ethyl acetate, methyl ethyl ketone, tetrahydrofuran and hydrocarbons for example are suitable.

According to the invention further input materials, for example catalysts or assistants and additives, may be added during the reaction according to step (b).

Suitable assistants and additives are known per se to those skilled in the art. Examples include surface-active substances, flame retardants, nucleating agents, oxidation stabilizers, antioxidants, lubricants and demolding aids, dyes and pigments, stabilizers, for example against hydrolysis, light, heat or discoloration, inorganic and/or organic fillers, reinforcers and plasticizers. Suitable assistants and additives may be found, for example in Kunststoffhandbuch [Plastics Handbook], volume VII, published by Vieweg and Hochtlen, Carl Hanser Verlag, Munich 1966 (p. 103-113).

Suitable catalysts are likewise known in principle from the prior art. Suitable catalysts are for example organic metal compounds selected from the group consisting of tin, titanium, zirconium, hafnium, bismuth, zinc, aluminum and iron organyls, for example tin organyl compounds, preferably tin dialkyls such as tin(II) isooctoate, tin dioctoate, dimethyltin or diethyltin, or tin organyl compounds of aliphatic carboxylic acids, preferably tin diacetate, tin dilaurate, dibutyltin diacetate, dibutyltin dilaurate, titanate esters, bismuth compounds, such as bismuth alkyl compounds, preferably bismuth neodecanoate or similar, or iron compounds, preferably iron(III) acetylacetonate.

In a preferred embodiment the catalysts are selected from tin compounds and bismuth compounds, more preferably tin alkyl compounds or bismuth alkyl compounds. Tin(II) isooctoate and bismuth neodecanoate are particularly suitable.

The catalysts are typically employed in amounts of 3 ppm to 2000 ppm, preferably 10 ppm to 1200 ppm, more preferably 20 ppm to 1000 ppm and most preferably 30 ppm to 800 ppm.

The molecular weight increase according to step (b) is effected via a reaction of the isocyanate groups with free acid/hydroxyl groups. According to the invention no further construction components are employed in the reaction according to step (b).

In particular, no short-chain diols are employed in the process according to the invention during the reaction according to step (a). It is furthermore preferable when no dicarboxylic acids are employed in the reaction according to step (a).

In a further embodiment the present invention accordingly relates to a process for producing a diblock copolymer as described hereinabove, wherein no short-chain diols are employed in the reaction according to step (a).

In a further embodiment the present invention accordingly relates to a process for producing a diblock copolymer as described hereinabove, wherein no dicarboxylic acids are employed in the reaction according to step (a).

In a further aspect the present invention also relates to a diblock copolymer obtained or obtainable by a process according to the invention.

The diblock copolymers according to the invention typically comprise a hard phase made of aromatic polyester and a soft phase made of polymer diols. It is preferable when the soft phase made of polymer diols is a soft phase made of polyetherdiols, particularly preferably made of PTHF. The soft phase strand more preferably has a molecular weight of greater than 500 g/mol.

The soft phase melting point (glass transition) of the diblock copolymers according to the invention is typically smaller than 10° C., preferably smaller than −20° C. and particularly preferably smaller than −30° C.

The processing of the obtained diblock copolymers may be effected according to customary processes, for example in extruders, injection molding machines, calenders, kneaders and presses.

On account of the good mechanical properties and the good temperature behavior the diblock copolymers according to the invention are suitable in particular for producing extruded, injection molded and pressed articles and also foams, cable sheaths, hoses, profiles, drive belts, fibers, nonwovens, films, moldings, plugs, housings, damping elements for the electricals industry, automotive industry, mechanical engineering, 3-D printing, medicine and consumer goods.

In a further aspect the present invention further relates to the use of a diblock copolymer according to the invention or a diblock copolymer obtained or obtainable by a process according to the invention for producing extruded, injection molded and pressed articles and also foams, cable sheaths, hoses, profiles, drive belts, fibers, nonwovens, films, moldings, plugs, housings, damping elements for the electricals industry, automotive industry, mechanical engineering, 3-D printing, medicine and consumer goods.

Further embodiments of the present invention are apparent from the claims and the examples. It will be appreciated that the features of the inventive subject matter/processes/uses mentioned above and elucidated below can be used not only in the combination specified in each case but also in other combinations, without departing from the scope of the invention. For example, the combination of a preferred feature with a particularly preferred feature or of a feature not characterized further with a particularly preferred feature etc. is thus also encompassed implicitly even if this combination is not mentioned explicitly.

Exemplary embodiments of the present invention, which do not limit the present invention, are described hereinbelow. In particular, the present invention also encompasses those embodiments which result from the hereinbelow recited dependency references and hence combinations.

1. A process for producing a diblock copolymer comprising the steps of
    (a) reaction of at least one aromatic polyester having a melting point in the range from 160° C. to 350° C. and at least one polymer diol having a melting point of less than 100° C. at a temperature of greater than 200° C. to obtain a mixture (G-a);
    (b) reaction of the mixture (G-a) with at least one diisocyanate,
    wherein the diisocyanate is employed in a molar amount of at least 0.9 based on the alcohol groups of the polymer diols.
2. The process according to embodiment 1, wherein the reaction according to step (a) is effected in continuous fashion.

3. The process according to embodiment 1 or 2, wherein the reaction according to step (a) is effected in an extruder.
4. The process according to any of embodiments 1 to 3, wherein the reaction according to step (b) is effected at a temperature in the range from 170° C. to 260° C.
5. The process according to any of embodiments 1 to 4, wherein the aromatic polyester is selected from the group consisting of polybutylene terephthalate (PBT), polyethylene terephthalate (PET) and polyethylene naphthalate (PEN).
6. The process according to any of embodiments 1 to 5, wherein the diisocyanate is selected from the group consisting of 2,2'-, 2,4'- and/or 4,4'-diphenylmethane-diisocyanate (MDI), 2, 4- and/or 2,6-tolylenediisocyanate (TDI), 4,4'-, 2,4'- and/or 2,2'-methylenedicyclohexyldiisocyanate (H12MDI), hexamethylenediisocyanate (HDI) and 1-isocyanato-3,3,5-trimethyl-5-isocyanatomethylcyclohexane (IPDI).
7. The process according to any of embodiments 1 to 6, wherein the polymer diol is a polyether diol.
8. The process according to any of embodiments 1 to 7, wherein the polymer diol is a polytetrahydrofuran.
9. The process according to any of embodiments 1 to 8, wherein no short-chain diols are employed in the reaction according to step (a).
10. The process according to any of embodiments 1 to 9, wherein no dicarboxylic acids are employed in the reaction according to step (a).
11. A diblock copolymer obtained or obtainable by a process according to any of embodiments 1 to 10.
12. The use of a diblock copolymer according to embodiment 11 or of a diblock copolymer obtained or obtainable by a process according to any of embodiments 1 to 10 for producing extruded, injection molded and pressed articles and also foams, cable sheaths, hoses, profiles, drive belts, fibers, nonwovens, films, moldings, plugs, housings, damping elements for the electricals industry, automotive industry, mechanical engineering, 3-D printing, medicine and consumer goods.
13. A process for producing a diblock copolymer comprising the steps of
    (a) continuous reaction of at least one aromatic polyester selected from the group consisting of polybutylene terephthalate (PBT), polyethylene terephthalate (PET) and polyethylene naphthalate (PEN) having a melting point in the range from 160° C. to 350° C. and at least one polymer diol having a melting point of less than 100° C. at a temperature of greater than 200° C. to obtain a mixture (G-a);
    (b) reaction of the mixture (G-a) with at least one diisocyanate,
    wherein the diisocyanate is employed in a molar amount of at least 0.9 based on the alcohol groups of the polymer diols.
14. The process according to claim 13, wherein the reaction according to step (a) is effected in an extruder.
15. The process according to either of claims 13 and 14, wherein the reaction according to step (b) is effected at a temperature in the range from 170° C. to 260° C.
16. The process according to any of claims 13 to 15, wherein the diisocyanate is selected from the group consisting of 2,2'-, 2,4'- and/or 4,4'-diphenylmethane-diisocyanate (MDI), 2, 4- and/or 2,6-tolylenediisocyanate (TDI), 4,4'-, 2,4'- and/or 2,2'-methylenedicyclohexyldiisocyanate (H12MDI), hexamethylenediisocyanate (HDI) and 1-isocyanato-3,3,5-trimethyl-5-isocyanatomethylcyclohexane (IPDI).
17. The process according to any of claims 13 to 16, wherein the polymer diol is a polyether diol.
18. The process according to any of claims 13 to 17, wherein the polymer diol is a polytetrahydrofuran.
19. The process according to any of claims 13 to 18, wherein no short-chain diols are employed in the reaction according to step (a).
20. The process according to any of claims 1 to 19, wherein no dicarboxylic acids are employed in the reaction according to step (a).
21. A diblock copolymer obtained or obtainable by a process according to any of claims 13 to 20.
22. The use of a diblock copolymer according to claim 21 or of a diblock copolymer obtained or obtainable by a process according to any of claims 13 to 20 for producing extruded, injection molded and pressed articles and also foams, cable sheaths, hoses, profiles, drive belts, fibers, nonwovens, films, moldings, plugs, housings, damping elements for the electricals industry, automotive industry, mechanical engineering, 3-D printing, medicine and consumer goods.

The examples which follow serve to illustrate the invention, but are in no way restrictive with respect to the subject matter of the present invention.

EXAMPLES

1. The Following Input Materials Were Employed:
Polyol 1: polybutylene terephthalate (PBT) having a weight average molecular weight of 60 000 g/mol
Polyol 2: Polyether polyol having an OH number of 174.7 and exclusively primary OH groups (based on tetramethylene oxide, functionality: 2)
Polyol 3: Polyether polyol having an OH number of 112.2 and exclusively primary OH groups (based on tetramethylene oxide, functionality: 2)
Polyol 4: mixture of 53.33% polyol 3 and 46.67% polyol 5
Polyol 5: Polyether polyol having an OH number of 55.8 and exclusively primary OH groups (based on tetramethylene oxide, functionality: 2)
Polyol 6: Polyether polyol having an OH number of 45.5 and exclusively primary OH groups (based on butanediol and adipic acid, functionality: 2)
Isocyanate 1: aromatic isocyanate (4,4' methylenediphenyldiisocyanate)
Isocyanat 2: aliphatic isocyanate (1,6-hexamethylenediisocyanate)
Catalyst 1: tin(II) dioctoate (10% strength in dioctyl adipate)
Antioxidant: sterically hindered phenol
Hydrolysis stabilizer 1: polymeric carbodiimide
Hydrolysis stabilizer 2: epoxidized soybean oil
2. Continuous Synthesis Example The polyester (PBT) is fed into the first barrel of a Coperion ZSK58 twin screw extruder with a processing length of 48D. After the melting of the polyester the polyol, and any catalyst present therein, are added in barrel 3. The transesterification is effected at barrel temperatures of 250-300° C. before in the fifth barrel the diisocyanate is added to the reaction mixture. The molar mass increase is effected downstream at barrel temperatures of 190-230° C. Following the synthesis the obtained polymer is underwater or strand pelletized and then dried.

The Amounts Employed are Summarized in Tables 1 and 2.

TABLE 1

Synthesis examples:

| | Example 1 | Example 2 | Example 3 | Example 4 | Example 5 | Example 6 |
|---|---|---|---|---|---|---|
| Polyol 1 [parts] | 60 | 60 | 60 | 60 | 60 | 60 |
| Polyol 2 [parts] | 12 | 12 | 12 | 24 | 24 | 36 |
| Iso 1 [parts] | 4.62 | 4.71 | 4.81 | 9.24 | 9.43 | 13.86 |

TABLE 2

Synthesis examples:

| | Example 7 | Example 8 | Example 9 | Example 10 |
|---|---|---|---|---|
| Polyol 1 [parts] | 60 | 60 | 60 | 60 |
| Polyol 2 [parts] | | 36 | 36 | |
| Polyol 3 [parts] | 36 | | | |
| Polyol 4 [parts] | | | | 36 |
| Polyol 5 [parts] | | | | |
| Iso 1 [parts] | 9.19 | | 14.61 | 7.03 |
| Iso 2 [parts] | | 9.14 | | |
| UV stab. 1 | | 1 | | |
| Hydrolysis stab. 1 | | 1 | | |
| Hydrolysis stab. 2 | | 0.5 | | |

The properties of the thermoplastic polyurethanes produced by the continuous synthesis are summarized in table 3 and table 4.

TABLE 3

Properties examples:

| | Example 1 | Example 2 | Example 3 | Example 4 | Example 5 | Example 6 |
|---|---|---|---|---|---|---|
| Shore D | 70 | 69 | 70 | 59 | 62 | 49 |
| Modulus of elasticity [MPa] | | | | | | |
| Tensile strength [MPa] | 45 | 43 | 45 | 30 | 33 | 66 |
| Elongation at break [%] | 460 | 460 | 430 | 720 | 480 | 620 |
| Tear propagation resistance [kN/m] | 196 | 192 | 204 | 135 | 160 | 127 |
| Compression set (72 h/23° C./30 min) [%] | 22 | 25 | 24 | 23 | 23 | 21 |
| Compression set (24 h/70° C./30 min) [%] | 47 | 43 | 47 | 46 | 47 | 44 |
| Compression set (24 h/100° C./30 min) [%] | 40 | 46 | 49 | 45 | 49 | 42 |
| Abrasion [mm$^3$] | 30 | 26 | 26 | 19 | 17 | 19 |
| TMA onset temperature (ΔT 20° C./Min) [° C.] | 199 | 199 | 198 | 182 | 178 | 164 |

TABLE 4

Properties examples:

| | Example 7 | Example 8 | Example 9 | Example 10 |
|---|---|---|---|---|
| Shore D | 50 | 47 | 48 | 49 |
| Modulus of elasticity [MPa] | | | | |
| Tensile strength [MPa] | 31 | 28 | 34 | 37 |
| Elongation at break [%] | 630 | 620 | 580 | 640 |
| Tear propagation resistance [kN/m] | 113 | 98 | 117 | 111 |
| Compression set (72 h/23° C./30 min) [%] | | | | |
| Compression set (24 h/70° C./30 min) [%] | | | | |
| Compression set (24 h/100° C./30 min) [%] | | | | |
| Abrasion [mm$^3$] | 22 | 21 | 24 | 32 |
| TMA onset temperature (ΔT 20° C./Min) [° C.] | | | | |

3. Methods of Measurement:

The methods of measurement that may be utilized for material characterization include: DSC, DMA, TMA, NMR, FT-IR, GPC, bursting pressure measurement

| | |
|---|---|
| Shore D hardness | DIN 7619-1 |
| Modulus of elasticity | DIN 53 504 |
| Tensile strength | DIN 53 504 |
| Elongation at break | DIN 53504 |

| | |
|---|---|
| Tear propagation resistance | DIN ISO 34-1, B |
| Abrasion | DIN 4649 |
| Compression set | DIN ISO 815 |
| Creep behavior | DIN EN ISO 899-1 |

The invention claimed is:

1. A process for producing a diblock copolymer, comprising:
   (a) contacting an aromatic polyester having a melting point in the range from 160° C. to 350° C. and a polymer diol having a melting point of less than 100° C. at a temperature of greater than 200° C. and polymerizing by transesterification to obtain a mixture (G-a);
   (b) reacting the mixture (G-a) with a diisocyanate to form the diblock copolymer,
   wherein at least 0.9 moles of the diisocyanate are reacted with the mixture (G-a) based on a molar amount of the hydroxyl groups of the polymer diol present in the reacting (a),
   wherein the aromatic polyester is selected from the group consisting of polybutylene terephthalate (PBT), polyethylene terephthalate (PET) and polyethylene naphthalate (PEN).

2. The process according to claim 1, wherein the polymerizing (a) is carried out by continuously mixing the aromatic polyester while adding the polymer diol to the aromatic polyester.

3. The process according to claim 1, wherein the polymerizing (a) is carried out in an extruder.

4. The process according to claim 1, wherein the reacting (b) is carried out at a temperature in the range from 170° C. to 260° C.

5. The process according to claim 1, wherein the diisocyanate is selected from the group consisting of 2,2'-, 2,4'- and/or 4,4'-diphenylmethanediisocyanate (MDI), 2, 4- and/or 2,6-tolylenediisocyanate (TDI), 4,4'-, 2,4'- and/or 2,2'-methylenedicyclohexyldiisocyanate (H12MDI), hexamethylenediisocyanate (HDI) and 1-isocyanato-3,3,5-trimethyl-5-isocyanatomethylcyclohexane (IPDI).

6. The process according to claim 1, wherein the polymer diol is a polyether diol.

7. The process according to claim 1, wherein the polymer diol is a polytetrahydrofuran.

8. The process according to claim 1, wherein no dicarboxylic acids are reacted with the aromatic polyester during the reacting (a).

9. A diblock copolymer obtained by a process according to claim 1.

10. The process according to claim 1, further comprising:
   forming, by at least one selected from the group consisting of extruding, injection molding and pressing the diblock copolymer, to produce an article, a foam, a cable sheath, a hose hoses, a profile, a drive belt, a fiber, a nonwoven, a film, a molding, a plug, a housing, or a damping element.

11. The process of claim 1, wherein the polymerizing (a) includes first melting the aromatic polyester in an extruder then adding the polymer diol to the molten aromatic polyester to transesterify the aromatic polyester and the polymer diol, then adding the diisocyanate to the transesterified mixture of the aromatic polyester and the polymer polyol, in the same extruder, to form the diblock copolymer.

12. The process according to claim 11, wherein the diblock copolymer includes a hard phase and a soft phase, wherein the hard phase represents polyester fragment portions of the transesterification product and the soft phase represents polymer diol portions of the transesterification product.

13. The process according to claim 11, wherein the diisocyanate reacts with acid and alcohol groups on the transesterification product to form the block copolymer.

14. The process according to claim 12, wherein the soft phase of the diblock copolymer has a molecular weight of greater than 500 g/mol and a glass transition point of less than −20° C.

15. The process according to claim 11, wherein the diblock copolymer has:
   a shore D modulus of elasticity of from 49 to 70 MPa according to DIN 7619-1,
   a tensile strength of 30-66 MPa according to DIN 53-504,
   an elongation at break of 430-620% according to DIN53-504,
   a tear propagation resistance of 135-204 kN/M according to DIN ISO 24-1 B, and
   a compression set of 21-25% at 72 h/23° C./30 min according to DIN ISO 815.

16. The process of claim 1, wherein during the polymerizing (a) the molten aromatic polyester is transesterified with only polymeric diol.

\* \* \* \* \*